(12) United States Patent
Urnau Gotardo et al.

(10) Patent No.: US 12,361,634 B2
(45) Date of Patent: Jul. 15, 2025

(54) TECHNIQUES FOR IMPROVED LIGHTING MODELS FOR APPEARANCE CAPTURE

(71) Applicants: DISNEY ENTERPRISES, INC., Burbank, CA (US); ETH Zürich (Eidgenössische Technische Hochschule Zürich), Zürich (CH)

(72) Inventors: Paulo Fabiano Urnau Gotardo, Zurich (CH); Derek Edward Bradley, Zurich (CH); Gaspard Zoss, La Tour-de-Peilz (CH); Jeremy Riviere, Zurich (CH); Prashanth Chandran, Zurich (CH); Yingyan Xu, Zurich (CH)

(73) Assignees: DISNEY ENTERPRISES, INC., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 249 days.

(21) Appl. No.: 18/081,593

(22) Filed: Dec. 14, 2022

(65) Prior Publication Data
US 2023/0196664 A1 Jun. 22, 2023

Related U.S. Application Data

(60) Provisional application No. 63/290,643, filed on Dec. 16, 2021.

(51) Int. Cl.
*G06T 15/50* (2011.01)
*G06T 7/00* (2017.01)
(Continued)

(52) U.S. Cl.
CPC .......... *G06T 15/506* (2013.01); *G06T 7/0012* (2013.01); *G06T 15/04* (2013.01);
(Continued)

(58) Field of Classification Search
None
See application file for complete search history.

(56) References Cited

U.S. PATENT DOCUMENTS

2011/0012901 A1   1/2011   Kaplanyan
2011/0227918 A1   9/2011   Takahashi
(Continued)

OTHER PUBLICATIONS

Gotardo et al. ( "Practical Dynamic Facial Appearance Modeling and Acquisition", ACM Trans. Graph., vol. 37, No. 6, Article 232. Publication date: Nov. 2018. (Year: 2018).*
(Continued)

*Primary Examiner* — Tapas Mazumder
(74) *Attorney, Agent, or Firm* — Squire Patton Boggs LLP; Sarah Mirza

(57) ABSTRACT

Various embodiments include a system for rendering an object, such as human skin or a human head, from captured appearance data. The system includes a processor executing a near field lighting reconstruction module. The system determines at least one of a three-dimensional (3D) position or a 3D orientation of a lighting unit based on a plurality of captured images of a mirror sphere. For each point light source in a plurality of point light sources included in the lighting unit, the system determines an intensity associated with the point light source. The system determines captures appearance data of the object, where the object is illuminated by the lighting unit. The system renders an image of the object based on the appearance data and the intensities associated with each point light source in the plurality of point light sources.

20 Claims, 9 Drawing Sheets

(51) Int. Cl.
    *G06T 15/04*    (2011.01)
    *G06T 15/06*    (2011.01)
    *H04N 13/254*   (2018.01)

(52) U.S. Cl.
    CPC ........... *G06T 15/06* (2013.01); *H04N 13/254* (2018.05); *G06T 2215/16* (2013.01)

(56) References Cited

U.S. PATENT DOCUMENTS

| | | | |
|---|---|---|---|
| 2017/0263043 A1 | 9/2017 | Peterson et al. | |
| 2019/0019025 A1 | 1/2019 | Yamazaki et al. | |
| 2019/0310376 A1* | 10/2019 | Geuens | G01S 17/18 |
| 2019/0339363 A1* | 11/2019 | Wu | G01S 17/42 |
| 2020/0393689 A1 | 12/2020 | Wada | |

OTHER PUBLICATIONS

Riviere ("Single-Shot High-Quality Facial Geometry and Skin Appearance Capture", ACM Trans. Graph., vol. 39, No. 4, Article 81. Publication date: Jul. 2020 (Year: 2020).*
Non Final Office Action received for U.S. Appl. No. 18/081,597 dated Aug. 8, 2024, 23 pages.
International Search Report for Application No. PCT/US2022/081832 dated Apr. 13, 2023.
Xu et al., "Improved Lighting Models for Facial Appearance Capture", Proceedings of Eurographics, DOI:10.2312/egs. 20221019, Apr. 25, 2022, pp. 5-8.
Wong et al., "Recovering Light Directions and Camera Poses from a Single Sphere", 16th European Conference-Computer Vision-ECCV, 2008, pp. 631-642.
Banterle et al., EnvyDepth: An interface for recovering local natural illumination from environment maps. Computer Graphics Forum 32, 7 (2013). Proc. Pacific Graphics 2013, pp. 1-11.
Beeler et al., High-quality single-shot capture of facial geometry. ACM Trans. Graphics (Proc. SIGGRAPH) 29, 3 (2010), pp. 1-10.
Beeler et al., High-quality passive facial performance capture using anchor frames. ACM Trans. Graphics (Proc. SIGGRAPH) 30 (Aug. 2011), pp. 1-10.
Bradley et al., High resolution passive facial performance capture. ACM Trans. Graphics (Proc. SIGGRAPH) 29, 4 (2010), pp. 1-10.
Debevec et al., Acquiring the reflectance field of a human face. In ACM ToG (SIGGRAPH) (2000), pp. 1-12.
Ghosh et al., Multiview face capture using polarized spherical gradient illumination. In ACM ToG (SIGGRAPH Asia) (2011), pp. 1-10.
Ghosh et al., Circularly polarized spherical illumination reflectometry. In ACM ToG (SIGGRAPH Asia). 2010, pp. 1-11.
Ghosh et al., Practical modeling and acquisition of layered facial reflectance. In ACM SIGGRAPH Asia 2008 papers. 2008, pp. 1-10.
Gotardo et al., Practical dynamic facial appearance modeling and acquisition. ACM ToG (SIGGRAPH Asia) 37, 6 (2018), pp. 1-13.
Li et al., Differentiable monte carlo ray tracing through edge sampling. ACM Transactions on Graphics (TOG) 37, 6 (2018), pp. 1-11.
Loubet et al., Reparameterizing discontinuous integrands for differentiable rendering. ACM Transactions on Graphics (TOG) 38, 6 (2019), pp. 1-14.
Ma et al., Rapid acquisition of specular and diffuse normal maps from polarized spherical gradient illumination. Rendering Techniques 2007, 9 (2007), pp. 1-12.
Mecca et al., Near field photometric stereo with point light sources. SIAM Journal on Imaging Sciences 7, 4 (2014), pp. 1-39.
Riviere et al., Single-shot high-quality facial geometry and skin appearance capture. ACM ToG (SIGGRAPH) 39, 4 (2020), pp. 1-12.
Weyrich et al., Analysis of human faces using a measurement-based skin reflectance model. ACM ToG (SIGGRAPH) 25, 3 (2006), pp. 1-12.
Xie et al., Photometric stereo with near point lighting: A solution by mesh deformation. In Proceedings of the IEEE Conference on Computer Vision and Pattern Recognition (2015), pp. 1-9.
Notice of Allowance received for U.S. Appl. No. 18/081,597 dated Feb. 5, 2025, 15 pages.

* cited by examiner

TECHNIQUES FOR IMPROVED LIGHTING MODELS FOR APPEARANCE CAPTURE

CROSS-REFERENCE TO RELATED APPLICATIONS

This application claims priority benefit of the United States Provisional Patent Application titled, "IMPROVED LIGHTING MODELS FOR APPEARANCE CAPTURE," filed on Dec. 16, 2021 and having Ser. No. 63/290,643. The subject matter of this related application is hereby incorporated herein by reference.

BACKGROUND

Field of the Various Embodiments

Various embodiments relate generally to appearance capture systems and, more specifically, to techniques for improved lighting models for appearance capture.

Description of the Related Art

One aspect of rendering realistic human faces is to capture the appearance of the skin, which has a complex multi-layer structure with combined surface and subsurface reflectance properties. Appearance capture techniques estimate geometry and reflectance properties of various objects (such as a human head, facial skin, and/or the like) by performing a computationally intensive inverse rendering optimization in which one or more images are re-rendered a large number of times and compared to real images captured by multiple cameras at various positions and orientations. While state-of-the-art appearance capture techniques have achieved impressive results, such techniques often make simplifying assumptions that do not always hold in reality, even though these simplifying assumptions help to reduce computational complexity and rendering time.

One such simplifying assumption is that light sources are often modeled as a collection of point light sources (referred to as an environment map) that are distant from the face. The light rays from each of these light sources are, therefore, assumed to strike all points on the face at the same incident angle (direction). Further, the directional distribution of incoming light is assumed to be spatially invariant within a small capture volume and, thus, easier to calibrate by taking directional samples from a single three-dimensional (3D) location. By contrast, appearance capture studios often have light sources that are relatively near to the object being captured. Therefore, the incident lighting angles from a single source indeed vary across the face. Assuming that the light rays from each light source are, instead, parallel with one another leads to rendering errors.

Another simplifying assumption presents when polarization is used for diffuse-specular reflectance separation in appearance capture systems. When an object being captured is illuminated with polarized light, and captured with a camera fitted with a cross-polarized lens, much of the specular reflectance of the lighting is filtered out, and the diffuse reflectance of the lighting remains. This separation of specular reflectance and diffuse reflectance is often assumed to be perfect, such that a diffuse albedo can be directly fitted to the cross-polarized imagery captured by the cameras. The specular reflectance is estimated once the diffuse reflectance is known. However, under linearly polarized illumination, this separation is view-dependent because the optimal polarizer orientation for each light source is different for each camera view. Therefore, the perfect separation assumption does not hold in general multi-view setups, where some specular reflectance remains in the cross-polarized imagery. In some examples, the amount of specular reflectance that remains in the cross-polarized imagery can be significant, particularly for diffuse-specular reflectance separation at camera angles that view the face of the object from below.

Yet another simplifying assumption is that appearance capture techniques often only account for lighting coming directly from the light sources. Indirect lighting, where light strikes one portion of the face, reflects off the face, and then illuminates a different portion of the face is often ignored. Similarly, the effect of multiple subsurface bounces of light is also often ignored. As a result, some real-world lighting effects such as soft shadows and color bleeding, are not accurately modeled, resulting in overshoot in recovered diffuse albedo and incomplete specular intensity. Such inaccuracies lead to further rendering errors.

As the foregoing illustrates, what is needed in the art are more effective techniques for capturing appearance data for the purpose of realistic rendering of human faces.

SUMMARY

Various embodiments of the present disclosure set forth a computer-implemented method for rendering an object, such as human skin or a human head, from captured appearance data. The method includes determining at least one of a three-dimensional (3D) position or a 3D orientation of a lighting unit based on a plurality of captured images of a mirror sphere. The method further includes, for each point light source in a plurality of point light sources included in the lighting unit, determining an intensity associated with the point light source. The method further includes capturing appearance data of the object, where the object is illuminated by the lighting unit. The method further includes rendering an image of the object based on the appearance data and the positions and intensities associated with each point light source in the plurality of point light sources.

Various embodiments of the present disclosure set forth a computer-implemented method for rendering an object, such as human skin or a human head from captured appearance data comprising a plurality of texels. The method includes determining texture coordinates of a first vector originating from a first texel where the first vector intersects a second texel. The method further includes rendering the second texel from a viewpoint of the first texel based on appearance data at the second texel. The method further includes based on the rendering of the second texel, determining an indirect lighting intensity incident to the first texel from the second texel. The method further includes updating appearance data at the first texel based on a direct lighting intensity and the indirect lighting intensity incident to the first texel from the second texel. The method further includes rendering the first texel based on the updated appearance data at the first texel.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed near field light reconstruction, lighting is more accurately modeled for multiple near field lighting unit. As a result, a field of near positional lighting units is reconstructed that more faithfully represents the true lights in the scene as compared to a conventional distant environment map. The disclosed polarization modeling more accurately models specular reflectance present in polarized lighting units, thereby improving appearance and reducing rendering error relative to techniques that model only the diffuse reflectance from polarized lighting units. The disclosed texture space indirect illumination more accurately models facial characteristics where light reflects off one portion of a facial model and strikes another portion of the facial model. Another technical advantage relative to the prior art is that the disclosed techniques, whether employed individually or in combination, provide improved accuracy and realism when rendering objects from appearance capture data, such as human faces, body parts, and/or other objects, with only modest increases in computational cost relative to prior techniques. The disclosed techniques account for the impact on inverse rendering quality when departing from idealized conditions, leading to more realistic models that more accurately capture and render facial appearance. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
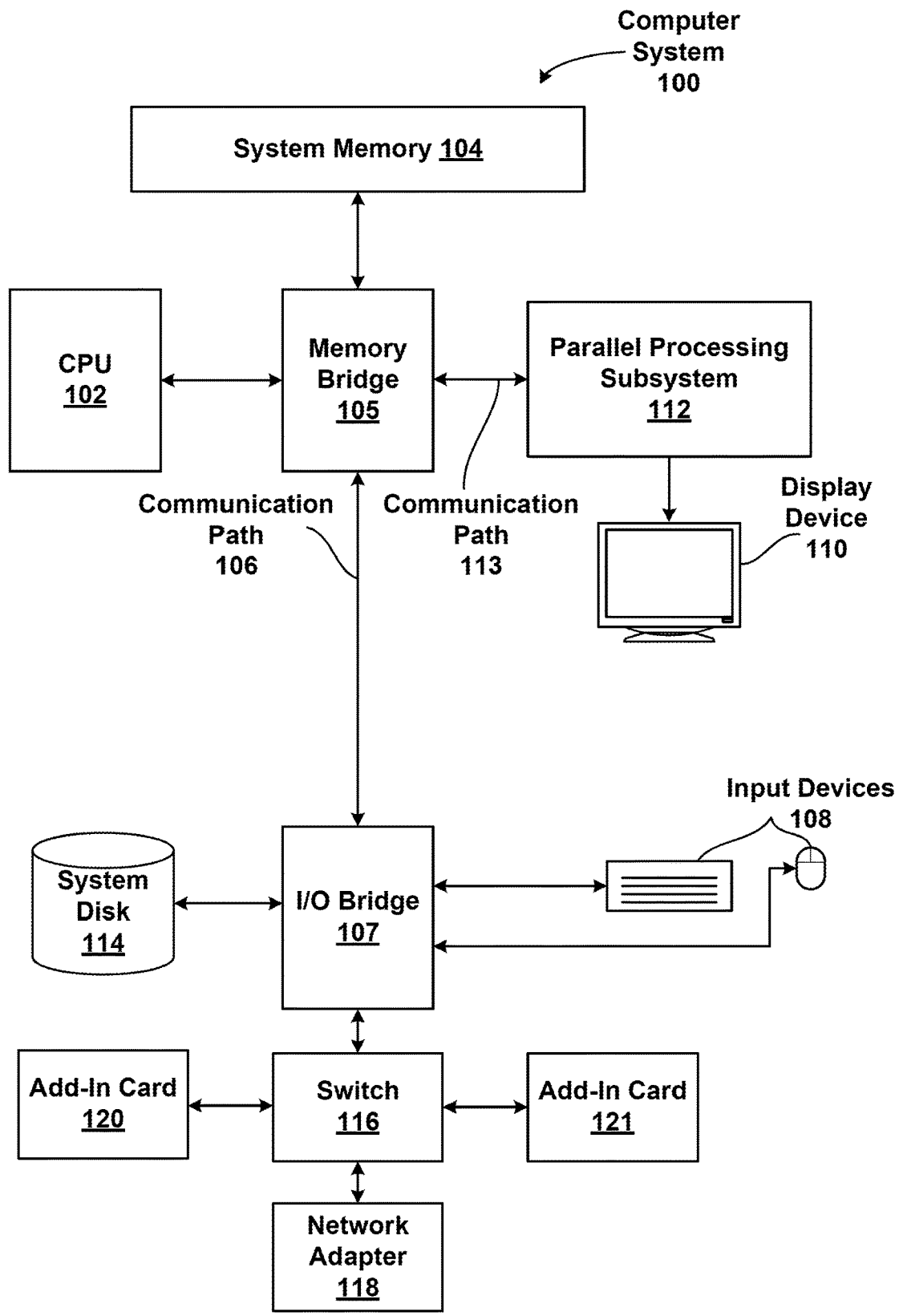
FIG. 1 is a block diagram of a computer system configured to implement one or more aspects of the various embodiments.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

In the following description, numerous specific details are set forth to provide a more thorough understanding of the various embodiments. However, it will be apparent to one skilled in the art that the inventive concepts may be practiced without one or more of these specific details.

System Overview

FIG. 1 illustrates a computer system 100 configured to implement one or more aspects of the various embodiments. As shown, the computer system 100 includes, without limitation, a central processing unit (CPU) 102 and a system memory 104 coupled to a parallel processing subsystem 112 via a memory bridge 105 and a communication path 113. The memory bridge 105 is further coupled to an I/O (input/output) bridge 107 via a communication path 106, and the I/O bridge 107 is, in turn, coupled to a switch 116.

In operation, the I/O bridge 107 is configured to receive user input information from one or more input devices 108, such as a keyboard, a mouse, a touchpad, a microphone, a joystick, etc., and forward the input information to the CPU 102 for processing via the communication path 106 and the memory bridge 105. The switch 116 is configured to provide connections between the I/O bridge 107 and other components of the computer system 100, such as a network adapter 118 and various add-in cards 120 and 121. Although two add-in cards 120 and 121 are illustrated, in some embodiments, the computer system 100 may only include a single add-in card or more than two add-in cards.

As also shown, the I/O bridge 107 is coupled to a system disk 114 that may be configured to store content, applications, and data for use by CPU 102 and parallel processing subsystem 112. As a general matter, the system disk 114 provides nonvolatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. Finally, although not explicitly shown, other components, such as universal serial bus or other port connections, compact disc drives, digital versatile disc drives, movie recording devices, and the like, may be connected to the I/O bridge 107 as well.

In various embodiments, the memory bridge 105 may be a Northbridge chip, and the I/O bridge 107 may be a Southbridge chip. In addition, communication paths 106 and 113, as well as other communication paths within the computer system 100, may be implemented using any technically suitable protocols, including, without limitation, AGP (Accelerated Graphics Port), HyperTransport, or any other bus or point-to-point communication protocol known in the art.

In some embodiments, the parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs) included within the parallel processing subsystem 112. In other embodiments, the parallel processing subsystem 112 incorporates circuitry optimized for general purpose and/or compute processing. Again, such circuitry may be incorporated across one or more PPUs included within the parallel processing subsystem 112 that are configured to perform such general purpose and/or compute operations. In yet other embodiments, the one or more PPUs included within the parallel processing subsystem 112 may be configured to perform graphics processing, general purpose processing, and compute processing operations. The system memory 104 may include at least one device driver configured to manage the processing operations of the one or more PPUs within the parallel processing subsystem 112.

In various embodiments, the parallel processing subsystem 112 may be or include a graphics processing unit (GPU). In some embodiments, the parallel processing subsystem 112 may be integrated with one or more of the other elements of FIG. 1 to form a single system. For example, the parallel processing subsystem 112 may be integrated with the CPU 102 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, the system memory 104 could be connected to the CPU 102 directly rather than through the memory bridge 105, and other devices would communicate with the system memory 104 via the memory bridge 105 and the CPU 102. In other alternative topologies, the parallel processing subsystem 112 may be connected to the I/O bridge 107 or directly to the CPU 102, rather than to the memory bridge 105. In still other embodiments, the I/O bridge 107 and the memory bridge 105 may be integrated into a single chip instead of existing as one or more discrete devices. In some embodiments, any combination of the CPU 102, the parallel processing subsystem 112, and the system memory 104 may be replaced with any type of virtual computing system, distributed computing system, or cloud computing environment, such as a public cloud, a private cloud, or a hybrid cloud. Lastly, in certain embodiments, one or more components shown in FIG. 1 may not be present. For example, the switch 116 could be eliminated, and the network adapter 118 and add-in cards 120, 121 would connect directly to the I/O bridge 107. The operating system 140 may be, e.g., Linux®, Microsoft Windows®, or macOS®.

Improved Lighting Models for Appearance Capture

Various embodiments are directed to techniques for capturing facial appearance data for the purpose of realistic rendering of human faces. The embodiments include improved lighting models for appearance capture that more accurately represent the lighting, while minimally increasing computational cost. The disclosed techniques can be employed in any combination.

In a first technique, referred to as "near field light reconstruction," a computer system uses multi-view images and triangulation to precisely measure the 3D locations of lighting unit for high-fidelity appearance capture. With this technique, the geometry of each lighting unit is represented as a rectangular 3D surface with known width and height (from manual measurements) and with position and orientation information in 3D space that is determined from multi-view images of a mirror sphere.

In a second technique, referred to as "polarization modeling," a computer system models a specular component in cross-polarized views rather than assuming purely diffuse reflectance for cross-polarized views. In a cross-polarized view, the lighting unit is polarized in one direction and the cameras are fitted with filters that are polarized in a different cross-polarized direction. Although most reflectance in a cross-polarized view is diffuse reflectance, the second technique models the remaining specular reflectance.

In a third technique, referred to as "texture space indirect illumination," a computer system models indirect lighting that results from light reflecting off one portion of the face and illuminating a different part of the face, such as when light reflects off the nose and indirectly illuminates the inner cheek. This technique can be incorporated into different inverse-rendering pipelines.

Figure 2:
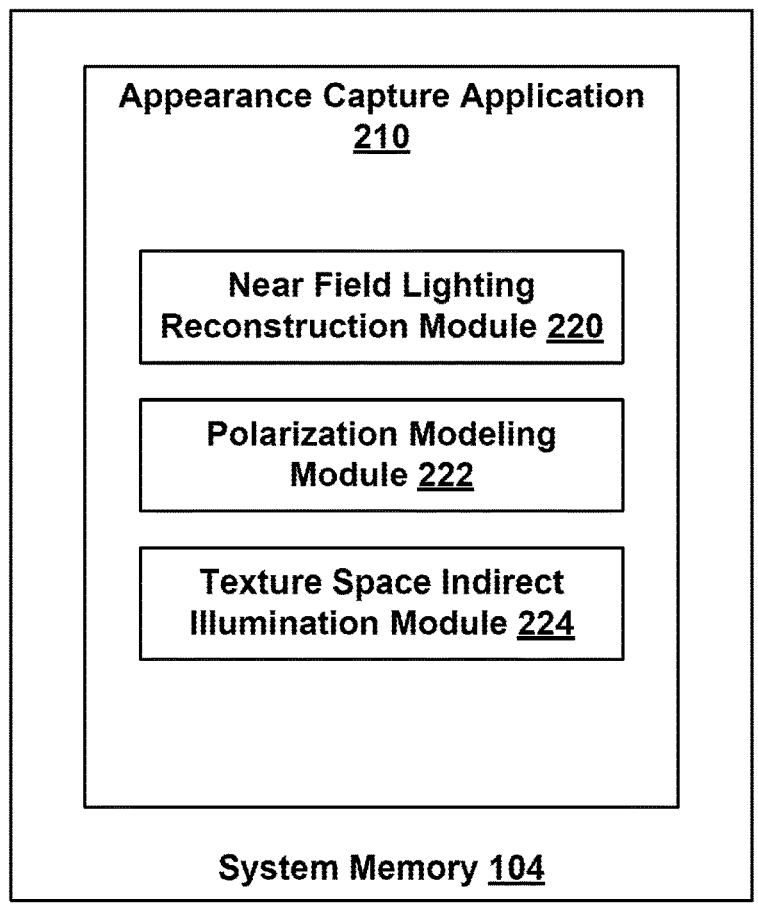
FIG. 2 is a more detailed view of the system memory of FIG. 1, according to various embodiments.

FIG. 2 is a more detailed view of the system memory 104 of FIG. 1, according to various embodiments. As shown, the system memory 104 includes, without limitation, an appearance capture application 210, which further includes a near field lighting reconstruction module 220, a polarization modeling module 222, and a texture space indirect illumination module 224. The appearance capture application 210, near field lighting reconstruction module 220, polarization modeling module 222, and texture space indirect illumination module 224, when executed by CPU 102, perform one or more operations associated with the techniques described herein. In some examples, the appearance capture application 210 is configured to capture facial appearance data for a human head. When performing the operations associated with the disclosed techniques, the appearance capture application 210, near field lighting reconstruction module 220, polarization modeling module 222, and texture space indirect illumination module 224 store data in and retrieve data from system memory 104 and/or system disk 114.

In operation, appearance capture application 210 captures appearance data for an object such as a human face. Appearance capture application 210 captures this appearance data from an appearance capture studio that lights the object with unpolarized, passive illumination and/or polarized, passive illumination. In some examples, the appearance capture studio includes a number of lighting units that are placed at a predetermined distance from the object being captured. For example, the appearance capture studio could include 32 bar lights that are arranged as 16 pairs of bar lights. The 16 pairs of bar lights could be arranged at various positions and orientations at various distances from the object. Each bar light is fitted with a horizontal, linear polarization filter. In some examples, the appearance capture studio further includes a number of image capture devices, such as still cameras, video cameras, and/or the like, to capture images of the object as the object is illuminated by the lighting units. For example, the appearance capture studio could include twelve video cameras that are arranged into 4 triplets, where each triplet of cameras includes: (i) a narrow baseline stereo camera pair that is not polarized; and (ii) a central camera, as shown and discussed in conjunction with FIG. 3. The stereo camera pair captures full facial reflectance and is also used for stereo reconstruction. The central camera is cross-polarized with respect to the polarization filter on the lighting units. The central camera mainly captures diffuse reflection. In some examples, the number and types of lighting units and image capture devices may vary, with the number of image capture devices affecting the number of triplet arrangements.

In an optional process, appearance capture application 210 models the illumination of the lighting units as a collection of distant directional sources in a typical latitude-longitude environment map. Appearance capture application 210 computes this environment map using a frontal unpolarized image capture to capture a high-dynamic range (HDR) image of a mirror sphere with known radius, placed at a single location where the object, such as a human face, is subsequently placed for appearance capture. By using multiple calibrated image capture devices, appearance capture application 210 triangulates the 3D position of the mirror sphere. The appearance capture application 210 projects 3D rays, also referred to herein as vectors, through the pixels of the HDR image capture devices. The 3D rays reflect off the surface of the mirror sphere and, based on the reflections, appearance capture application 210 determines the incoming light directions associated with the pixel intensities of the HDR image capture devices.

Appearance capture application 210 measures the illumination of the lighting units using an approach of capturing multiple exposures of a mirror sphere from a particular camera view. In some examples, in order to improve the speed of appearance capture, appearance capture application 210 can compute a sparse representation of the lighting units, such as by computing the lighting units as a limited resolution of a fixed number of lighting directions uniformly distributed over the frontal hemisphere of the object being captured.

In order to improve the appearance parameters, appearance capture application 210 implements a custom renderer that operates in UV texture-space, and reconstructs a diffuse albedo, specular albedo (intensity), and high-resolution normal map. Further, as described herein, appearance capture application 210 improves rendering quality by executing any one or more of near field lighting reconstruction module 220 to reconstruct the near field lighting units, also referred to herein as near field lighting units, polarization modeling module 222 to more accurately model the light polarization, and texture space indirect illumination module 224 to account for indirect illumination of the object being captured.

In operation, near field lighting reconstruction module 220 improves the first approximation lighting model of a distant light source environment map by explicitly reconstructing the 3D geometry and intensities of the near field lighting units. Near field lighting reconstruction module 220 captures multi-view images and employs triangulation to measure the 3D locations of the lighting units for high-fidelity appearance capture. For the example and non-limiting appearance capture studio described herein, near field lighting reconstruction module 220 represents the geometry of each lighting unit as a light-emitting diode (LED) bar light with a rectangular 3D surface of known width and height. The width and height of the lighting unit can be determined a priori from manual measurements, specification data sheets, and/or the like. Near field lighting reconstruction module 220 determines the position and orientation of each lighting unit in 3D space based on multi-view images of the mirror sphere. In addition, near field lighting reconstruction module 220 models the near field lighting unit as a fixed number of point light sources that are uniformly placed inside each lighting unit. Near field lighting reconstruction module 220 calibrates the intensities of these point light sources using captured HDR images. In some examples, the intensities are further fine-tuned during appearance capture, in order to better match the rendered images to the real images, as described herein.

At a first step, near field lighting reconstruction module 220 determines the position and orientation of each lighting unit. To locate each lighting unit in 3D space, near field lighting reconstruction module 220 identifies and annotates the corner vertices of each lighting unit as the corner vertices that appear on the multi-view images of the mirror sphere, as captured by the image capture devices. For each identified and annotated corner vertex, near field lighting reconstruction module 220 projects 3D rays from each image capture device through the identified and annotated corner vertex and reflects the 3D rays off of the mirror sphere. Near field lighting reconstruction module 220 sets the position of the current corner vertex as the position in 3D space that is closest to all reflected rays. In some examples, near field lighting reconstruction module 220 determines the closest position by regressing the reflected rays to a 3D position of the lighting unit by applying least squares regression to the reflected 3D rays. Near field lighting reconstruction module 220 repeats this process for all remaining corner vertices for each lighting unit. In this manner, near field lighting reconstruction module 220 optimizes for the 3D light source positions that minimize the corner 3D ray intersection distances for the corresponding corner vertices of each lighting unit. In addition, near field lighting reconstruction module 220 determines the orientation of each lighting unit. Based on the 3D positions of the corner vertices of the lighting unit, near field lighting reconstruction module 220 determines the plane in 3D space that intersects the corner vertices. Based on this plane, near field lighting reconstruction module 220 computes a normal vector of the plane. Near field lighting reconstruction module 220 selects the direction of the normal vector that is towards the center of the mirror sphere. In some examples, near field lighting reconstruction module 220 determines the orientation of each lighting unit by weakly enforcing a regularization constraint that orients the normal vector of the plane of the lighting unit towards the center of the mirror sphere, while accounting for potential inaccuracies in the annotations of the corner vertices.

In this regard, near field lighting reconstruction module 220 initially determines the 3D position of the mirror sphere from multi-view annotations which may be inaccurate. Therefore, near field lighting reconstruction module 220 jointly optimizes for the position of the mirror sphere during light reconstruction of the near field lighting units. Upon completion of jointly optimizing for the position and orientation of the lighting units and the mirror sphere, near field lighting reconstruction module 220 generates a set of 3D oriented shapes, where each shape represents the geometry of the corresponding lighting unit.

At a second step, near field lighting reconstruction module 220 samples a set of point light sources inside each lighting unit. In some examples, near field lighting reconstruction module 220 samples ten point light sources inside each lighting unit. Alternatively, the number of point light sources per lighting unit can be more than ten or less than ten. Near field lighting reconstruction module 220 captures an HDR image of the mirror sphere with one of the frontal unpolarized image capture devices. For each pixel in this HDR image, near field lighting reconstruction module 220 projects a 3D ray towards the mirror sphere and assigns the observed pixel intensity to the point light source that is nearest to the reflected ray. Each point light source can accumulate the intensity contributions of multiple pixels in the HDR image. During accumulation, near field lighting reconstruction module 220 adjusts the intensity contribution of each pixel to factor out the attenuation of light along the ray as the light travels from the point light source to the mirror sphere, using the inverse-square-distance law. Via this technique, near field lighting reconstruction module 220 generates a reconstructed set of near field positional lights with more accurate, spatially-varying light source intensities during rendering, relative to a conventional environment map that assumes distant light sources.

Because near field lighting reconstruction module 220 generates the near field positional lights using all relevant viewpoints, the near field positional lights more faithfully represent the true lighting units in the scene relative to a conventional environment map. Additionally or alternatively, near field lighting reconstruction module 220 performs an inverse rendering operation without manual intervention, such as by imaging a diffuse object, imaging cross-polarized views of the object being captured, and/or the like. With this inverse rendering approach, near field lighting reconstruction module 220 independently illuminates each lighting unit one-by-one (and/or in combinations) and adjusting the intensities of the point light sources within the lighting unit to best fit the captured images. Near field lighting reconstruction module 220 repeats this process or each lighting unit.

In operation, polarization modeling module 222 simulates polarized light transport including both diffuse reflectance and the portion of the specular reflectance that remains after polarized light is reflected and filtered. Polarization modeling module 222 models polarization of light with Mueller calculus, which employs Stokes vectors and Mueller matrices. A Stokes vector includes four Stokes parameters, which can be expressed as $s=(s_0, s_1, s_2, s_3)$. The Stokes parameters include a first parameter so that expresses intensity, a second parameter $s_1$ that expresses horizontal/vertical polarization, a third parameter $s_2$ that expresses diagonal polarization, and a fourth parameter $s_3$ that expresses circular polarization. A Mueller matrix is a 4×4 matrix that models how polarization of light changes after an incident light beam is transformed, resulting in an emerging light beam. This relationship can be expressed as $s_e = M \times s_i$, where Stokes vector $s_i$ models the incident light, Stokes vector $s_e$ models the emergent light, and Mueller matrix M models the transformation from the incident light to the emergent light.

Polarization modeling module 222 simulates each of the lighting units as a lighting unit that casts incident light, represented as $s_i$, on a polarization filter, represented by Mueller matrix $M_0$ that is linearly polarized in a horizontal direction. As a result, the emergent light is linearly polarized in a horizontal direction, which is expressed as Stokes vector $s_a = M_0 \times s_i = (1, 1, 0, 0)$. At each point on the object being captured, polarization modeling module 222 determines the direction of the incident light from the lighting unit via the polarization filter. Polarization modeling module 222 further determines the direction of the outgoing emergent light after specular reflection off the surface of the object being captured. Given the direction of the incident light and the direction of the outgoing emergent light, polarization modeling module 222 determines Mueller matrix $M_1$ that represents the transformation of the incident light from the polarization filter after specular reflection off the surface of the object being captured. The reflected light is expressed as Stokes vector $s_b = M_1 \times s_a = (s_0, s_1, s_2, s_3)$. Stokes parameter so of Stokes vector $s_b$ is referred to herein as the Fresnel gain for the specular component. Polarization modeling module 222 modulates the diffuse component of the polarized light with 1 minus the Fresnel gain, or $(1 - s_0)$.

In some examples, one or more imaging capture devices are fitted with a polarization filter, represented by Mueller matrix $M_2$, that is linearly polarized in a vertical direction, resulting in image capture of cross-polarized views. In such examples, polarization modeling module 222 determines a Stokes vector $s_c = M_2 \times M_1 \times s_a$, where $s_c$ represents the effect of specular reflection of horizontally polarized light off the surface of the object being captured and subsequently captured by an image capture device with a vertically polarized filter. In this manner, polarization modeling module 222 models the specular reflectance component of polarized light rather than only the diffuse reflectance component of polarized light.

In contrast, if polarization modeling module 222 is not deployed, appearance capture application 210 assumes purely diffuse reflectance of the vertically (cross-) polarized views. Further, for image capture devices that are not fitted with a vertically polarized filter, appearance capture application 210 simply uses the Fresnel curve for p-polarized light with the equations for unpolarized light transport.

In operation, texture space indirect illumination module 224 models indirect reflections of light on the surface of the object being captured. The model of indirect reflections of light augments the results of appearance capture application 210 which models subsurface scattering using a texture space technique with precomputed visibility and shadow maps. In this regard, texture space indirect illumination module 224 determines indirect lighting effects by employing a texture space indirect illumination method for inverse rendering based on Monte Carlo sampling. Texture space is an image space that models the surface appearance of a 3D object, such as the object being captured. Texture space is composed of individual texture elements, referred to herein as texels. Texture space indirect illumination module 224 samples texel coordinates in UV space of neighboring vertices that contribute to indirect lighting. These neighboring texels effectively act as additional point lights, where such a neighboring texel reflects incident light onto other texels. Texture space indirect illumination module 224 fixes the directions of the reflected light rays from the neighboring texels during optimization. In a particular example, texture space indirect illumination module 224 models indirect reflections of light that illuminate a current texel $\mu_0$ as follows:

At a first step, texture space indirect illumination module 224 projects 3D rays from the 3D position of texel $\mu_0$ along random directions over the hemisphere of the object point being captured that is visible to one or more imaging devices. For each 3D ray, texture space indirect illumination module 224 determines if the 3D ray intersects the geometry of the object at one or more neighboring 3D points with corresponding texels $\mu_i$. Texture space indirect illumination module 224 stores the UV coordinates of these intersections with neighboring texels $\mu_i$. At a second step, for each intersection stored in the first step, texture space indirect illumination module 224 uses the current appearance parameters at the corresponding neighboring texel $\mu_i$ to render texel $\mu_i$ from the viewpoint of the current texel $\mu_0$. Texture space indirect illumination module 224 uses the result of rendering texel $\mu_i$ as the intensity of indirect lighting incident to texel $\mu_i$ to constrain inverse rendering at texel $\mu_0$. At a third step, texture space indirect illumination module 224 performs an optimization step to update the appearance parameters at texel $\mu_0$, thereby rendering texel $\mu_0$ with both direct and indirect lighting. Texture space indirect illumination module 224 iterates this process over the texels included in the texture map and repeats steps 2-3 until convergence is achieved.

The texture space indirect illumination techniques performed by texture space indirect illumination module 224 can be implemented as a non-invasive module that is incorporated into different inverse-rendering pipelines, such as appearance capture application 210, to enable indirect illumination and to generate results with a more realistic appearance. By accounting for indirect reflection of light, texture space indirect illumination module 224 can generate softer and more realistic rendering of the shadows. As a result, texture space indirect illumination module 224 can generate facial appearance maps (such as diffuse and specular albedo maps) that are more complete or with less overshoot, particularly in areas of concavities on the object begin captured. In some examples, texture space indirect illumination module 224 can reduce computational cost by computing indirect illumination only for texels that reside in an area of concavity present in the object being captured, where the effect of indirect light is likely to be more significant relative to more planar and/or convex portions of the object.

It will be appreciated that the system shown herein is illustrative and that variations and modifications are possible. Among other things, the techniques described herein are employed in an appearance capture studio that is fitted with rectangular LED light sources. Additionally or alternatively, the techniques can be employed with any technically feasible lighting technology and with lighting units of any shape and size within the scope of the present disclosure. Further, the techniques can be employed with any number of lighting units and any number of image capture devices in any combination. The techniques described herein include lighting units fitted with horizontally polarized filters and image capture devices with vertically polarized filters. Additionally or alternatively, the lighting units can be fitted with vertically polarized filters and image capture devices with horizontally polarized filters. Additionally or alternatively, the lighting units and image capture devices can be fitted with polarized filters in any orientation that provides cross-polarized views at the image capture devices.

Figure 3:
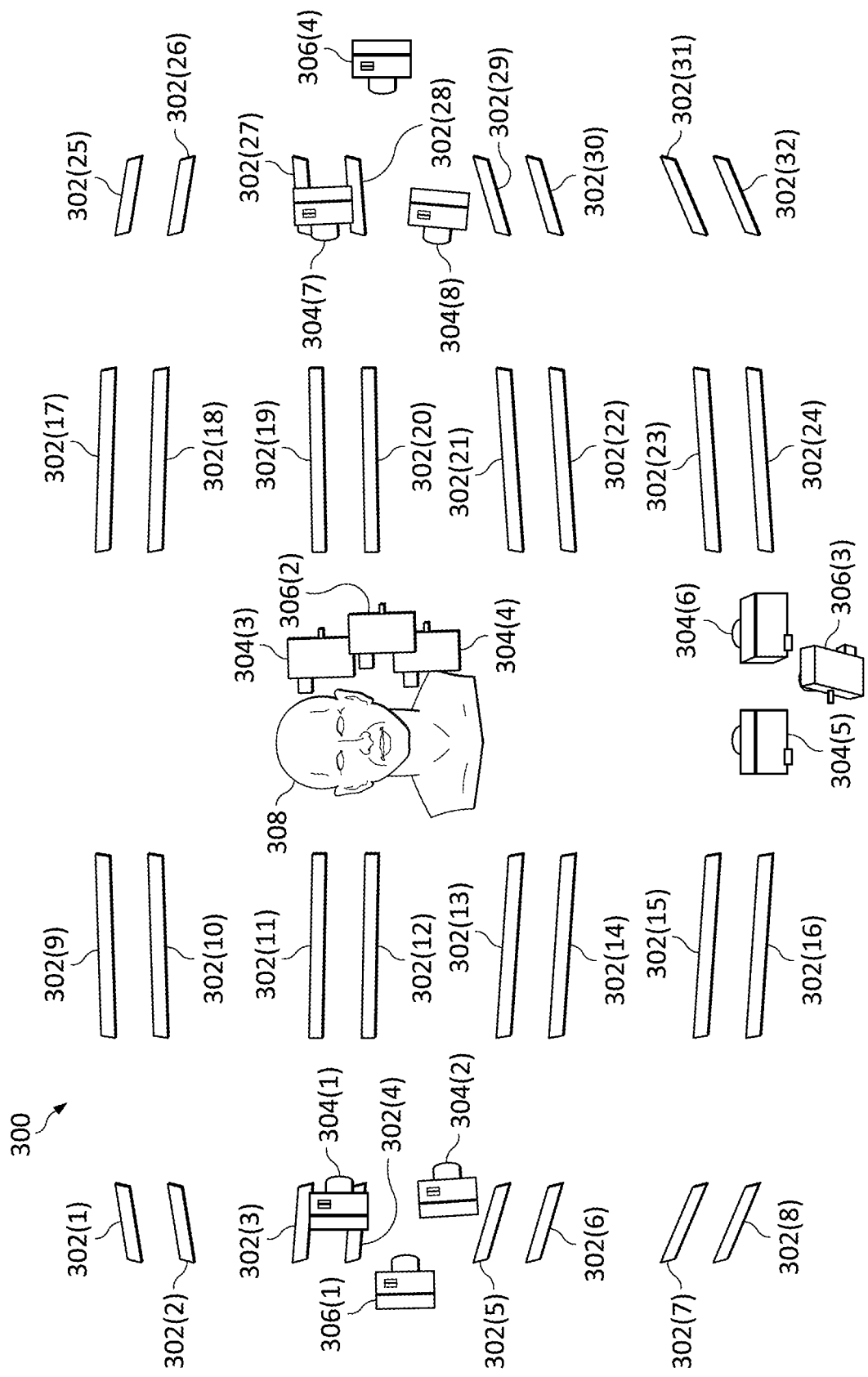
FIG. 3 is a schematic diagram of an appearance capture studio, according to various embodiments.

FIG. 3 is a schematic diagram of an appearance capture studio 300, according to various embodiments. As shown, the appearance capture studio 300 includes, without limitation, 32 near field lighting units 302(1)-302(32), eight non-polarized image capture devices 304(1)-304(8), four polarized image capture devices 306(1)-306(4), and an object 308, such as human skin or a human head, that is being captured in the appearance capture studio 300.

The 32 near field lighting units 302(1)-302(32) are distributed around the front hemisphere of the object 308 so as to illuminate the facial features of the head. The 32 near field lighting units 302(1)-302(32) are arranged as 16 pairs of 32 near field lighting units 302(1)-302(32). Near field lighting units 302(1)-302(2) form a first pair, near field lighting units 302(3)-302(4) form a second pair, and so on, with near field lighting units 302(31)-302(32) forming a sixteenth pair. One or more of the near field lighting units 302(1)-302(32) are fitted with switchable linearly polarized filters that are engaged and disengaged at different times during appearance capture. For example, the linearly polarized filters can be engaged when polarization modeling module 222 is modeling the specular components of polarized field lighting units. The linearly polarized filters can be disengaged during operations that do not used polarized light, such as when texture space indirect illumination module 224 is performing indirect lighting calculations. Additionally or alternatively, a subset of the near field lighting units 302(31)-302(32) are fitted with linearly polarized filters and a different subset of the near field lighting units 302(31)-302(32) are unpolarized field lighting units. In such cases, the polarized field lighting units and the unpolarized field lighting units can be illuminated or extinguished as needed at different times during appearance capture.

The eight non-polarized image capture devices 304(1)-304(8) and four polarized image capture devices 306(1)-306(4) are distributed around the front hemisphere of the object 308 so as to capture the appearance of the facial features of the head as illuminated by near field lighting units 302(1)-302(32). In some embodiments, the eight non-polarized image capture devices 304(1)-304(8) can be replaced by eight parallel-polarized image capture devices that capture complementary reflectance data, relative to the cross-polarized image capture devices. The eight non-polarized image capture devices 304(1)-304(8) and four polarized image capture devices 306(1)-306(4) are arranged into four triplets, where each triplet of image capture devices includes two non-polarized image capture devices 304 and one polarized image capture device 306. More specifically, non-polarized image capture devices 304(1)-304(2) and polarized image capture device 306(1) form a first triplet of image capture devices. Non-polarized image capture devices 304(3)-304(4) and polarized image capture device 306(2) form a second triplet of image capture devices, and so on. Each pair of non-polarized image capture devices 304 captures full facial reflectance and is also used for stereo reconstruction. Each polarized image capture device 306 is cross-polarized with respect to the polarization filters on the near field lighting units 302(31)-302(32). Each polarized image capture device 306 mainly captures diffuse reflection as well as specular reflection that remains in the polarized image views.

Figure 4A:
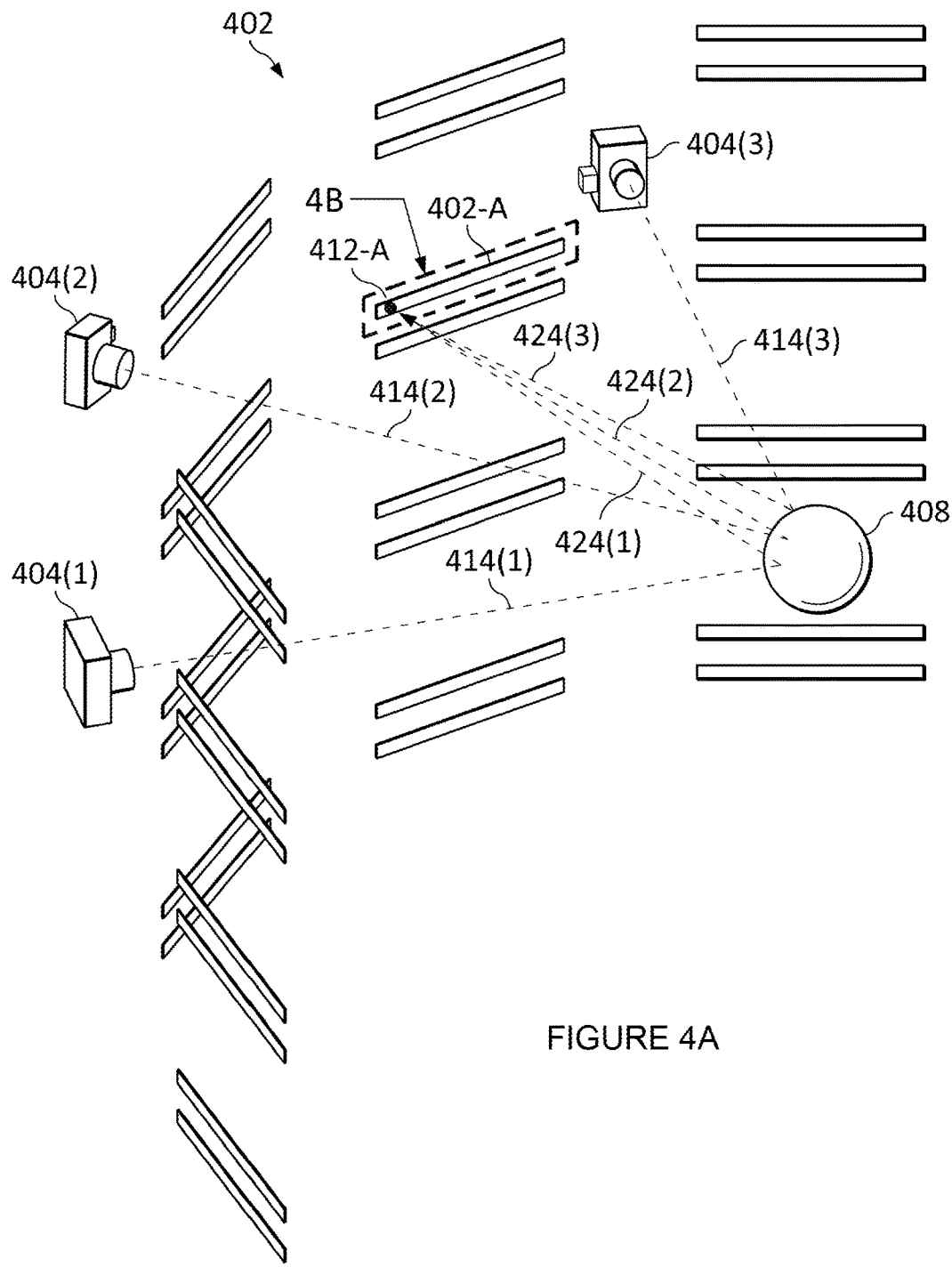
FIGS. 4A-4B illustrates techniques for reconstructing a near field lighting unit, according to various embodiments.
Figure 4B:
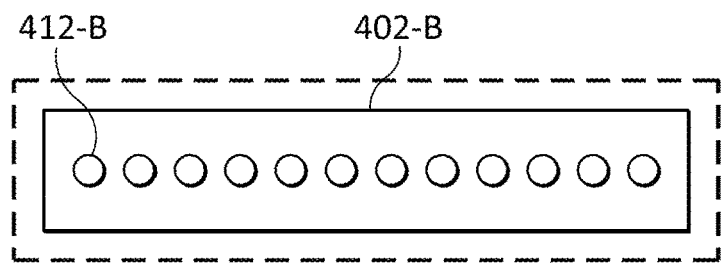

FIGS. 4A-4B illustrates techniques for reconstructing a near field lighting unit 402, according to various embodiments. As shown in FIG. 4A, near field lighting reconstruction module 220 projects 3D rays 414 from each of three image capture devices 404 onto a mirror sphere 408. More particularly, near field lighting reconstruction module 220 shown in FIG. 2 projects 3D rays 414(1), 414(2), and 414(3) from each of image capture devices 404(1), 404(2), and 404(3) respectively. Based on the position and size of the mirror sphere 408, near field lighting reconstruction module 220 determines the incident angle of each of the 3D rays 414(1), 414(2), and 414(3) as well as the reflection angles for corresponding reflected 3D rays 424(1), 424(2), and 424(3). In particular, near field lighting reconstruction module 220 determines that 3D ray 414(1) reflects off the surface of the mirror sphere, resulting in 3D ray 424(1). Likewise, near field lighting reconstruction module 220 determines that 3D ray 414(2) reflects off the surface of the mirror sphere, resulting in 3D ray 424(2), and that 3D ray 414(3) reflects off the surface of the mirror sphere, resulting in 3D ray 424(3). Near field lighting reconstruction module 220 determines where the reflected 3D rays 424(1), 424(2), and 424(3) intersect with the near field lighting units 402.

As shown, reflected 3D rays 424(1), 424(2), and 424(3) intersect near field lighting unit 402-A at point 412-A. Near field lighting unit 402-A is shown in front facing view in FIG. 4B as near field lighting unit 402-B. Near field lighting unit 402-B is modeled as an array of point light sources, where all of the reflected 3D rays 424(1), 424(2), and 424(3) intersect near field lighting unit 402-B at point light source 412-B. In alternative embodiments, one or more near field lighting units, such as near field lighting unit 402-B, can be modeled as any array of point light sources, such as a 1D linear array of point light sources, a 2D grid arranged as multiple rows of point light sources, an arbitrary 2D shape of point light sources, and/or the like. As a result, near field lighting reconstruction module 220 accumulates the intensity contribution of reflected 3D rays 424(1), 424(2), and 424(3) and stores the intensity contribution as part of the illumination associated with point light source 412-B. As a result, point light source 412-B, as well as all point light sources 412 for all near field lighting units 402, is based on the positions and orientations of the near field lighting units 402, the image capture devices 404, and the mirror sphere 408.

Figure 5:
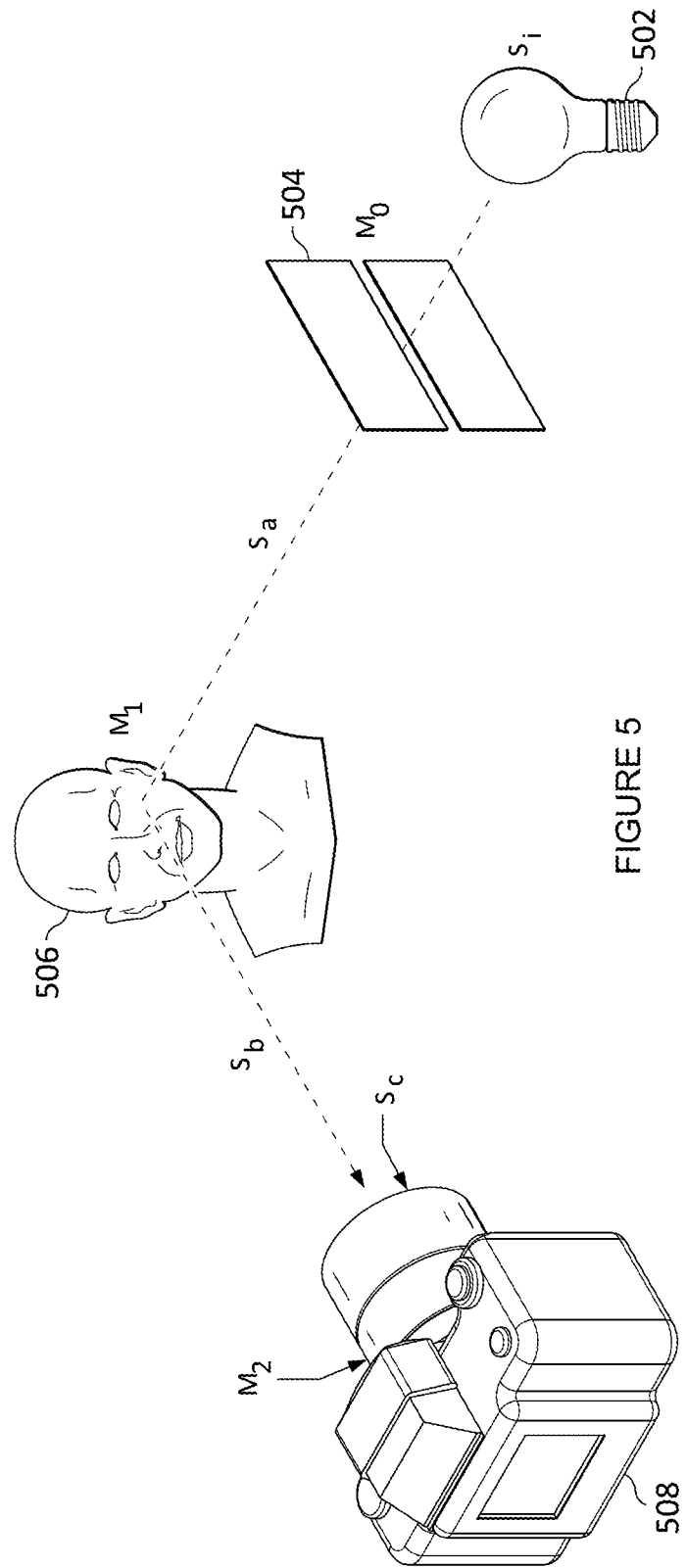
FIG. 5 illustrates techniques for modeling specular components of a polarized lighting unit, according to various embodiments.

FIG. 5 illustrates techniques for modeling specular components of a polarized lighting unit, according to various embodiments. As shown, a lighting unit 502 generates light and is modeled with Stokes vector $s_i$. Lighting unit 502 generates incident light that intersects with polarization filter 504 that is modeled with Mueller matrix $M_0$. Incident light from lighting unit 502 that intersects with polarization filter 504 is transformed by Mueller matrix $M_0$. If polarization filter 504 is linearly polarized in a horizontal direction, then the resulting light that passes through polarization filter 504 is modeled by the Stokes vector $s_a=M_0 \times s_i=(1, 1, 0, 0)$. The resulting light transmitted via polarization filter 504 strikes the object 506 being captured. Given the direction of the incident light from polarization filter 504 and the direction of the outgoing emergent light reflecting off of the object 506 being captured, polarization modeling module 222 determines Mueller matrix $M_1$ that represents the transformation of the incident light from polarization filter 504 after specular reflection off the surface of the object 506 being captured. The reflected light is expressed as Stokes vector $s_b=M_1 \times s_a=(s_0, s_1, s_2, s_3)$.

If image capture device 508 is fitted with a second polarization filter, represented by Mueller matrix $M_2$, that is linearly cross-polarized with respect to polarization filter 504, then image capture device 508 captures cross-polarized images. In such examples, polarization modeling module 222 determines a Stokes vector $s_c=M_2 \times M_1 \times s_a$, where $s_c$ represents the effect of specular reflection of horizontally polarized light off the surface of the object being captured and subsequently captured by an image capture device with a vertically polarized filter. In this manner, polarization modeling module 222 models the specular reflectance component of polarized light in cross-polarized views as well as the diffuse reflectance component of polarized light.

Figure 6:
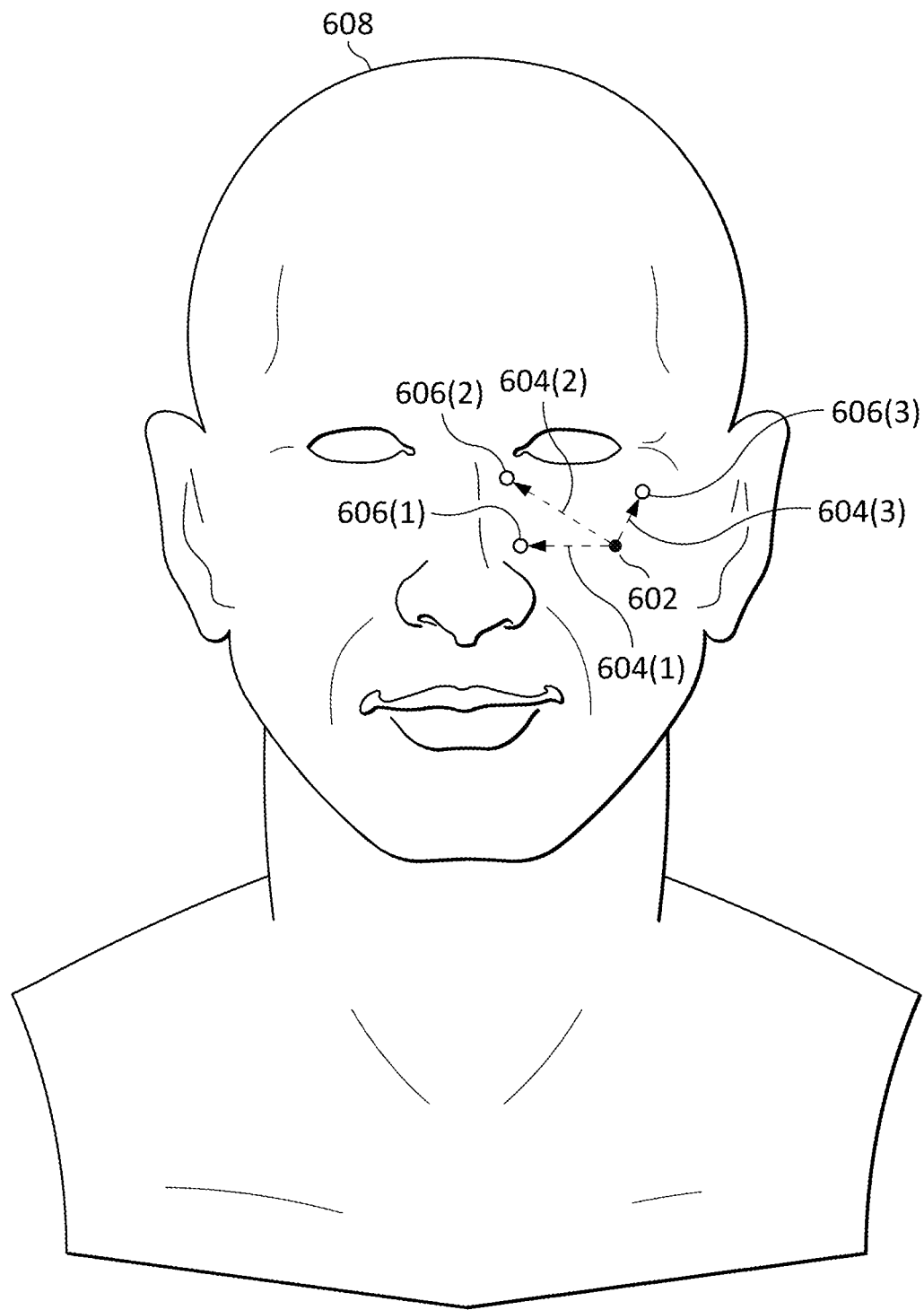
FIG. 6 illustrates techniques for modeling indirect lighting of an object being captured, according to various embodiments.

FIG. 6 illustrates techniques for modeling indirect lighting of an object 608 being captured, according to various embodiments. As shown, the surface of the object 608 includes a texel $\mu_0$ 602 that is illuminated by direct light from one or more lighting units (not shown) and indirect light from neighboring texels $\mu_1$ 606(1), $\mu_2$ 606(2), and $\mu_3$ 606(3). To model indirect lighting of object 608, texture space indirect illumination module 224 projects 3D rays 604(1)-604(3) from the 3D position of texel $\mu_0$ along random directions over the hemisphere of the object 608 being captured that is visible to one or more imaging devices. For each 3D ray, such as 3D rays 604(1)-604(3), texture space indirect illumination module 224 determines if the 3D ray intersects the geometry of the object 608 at one or more neighboring texels. As shown, 3D rays 604(1)-604(3) intersect neighboring texels $\mu_1$ 606(1), $\mu_2$ 606(2), and $\mu_3$ 606(3), respectively. Texture space indirect illumination module 224 stores the UV coordinates of these intersections with neighboring texels $\mu_1$ 606(1), $\mu_2$ 606(2), and $\mu_3$ 606(3).

For each stored intersection, texture space indirect illumination module 224 uses the current appearance parameters at the corresponding neighboring texels $\mu_1$ 606(1), $\mu_2$ 606(2), and $\mu_3$ 606(3) to render texels $\mu_1$ 606(1), $\mu_2$ 606(2), and $\mu_3$ 606(3), respectively, from the viewpoint of the current texel $\mu_0$ 602. Texture space indirect illumination module 224 uses the result of rendering neighboring texels $\mu_1$ 606(1), $\mu_2$ 606(2), and $\mu_3$ 606(3) as contributions to the intensity of indirect lighting from neighboring texels $\mu_1$ 606(1), $\mu_2$ 606(2), and $\mu_3$ 606(3), respectively, to constrain inverse rendering at texel $\mu_0$ 602. Texture space indirect illumination module 224 performs an optimization step to update the appearance parameters at texel $\mu_0$ 602, thereby rendering texel $\mu_0$ 602 with both direct and indirect lighting.

Figure 7:
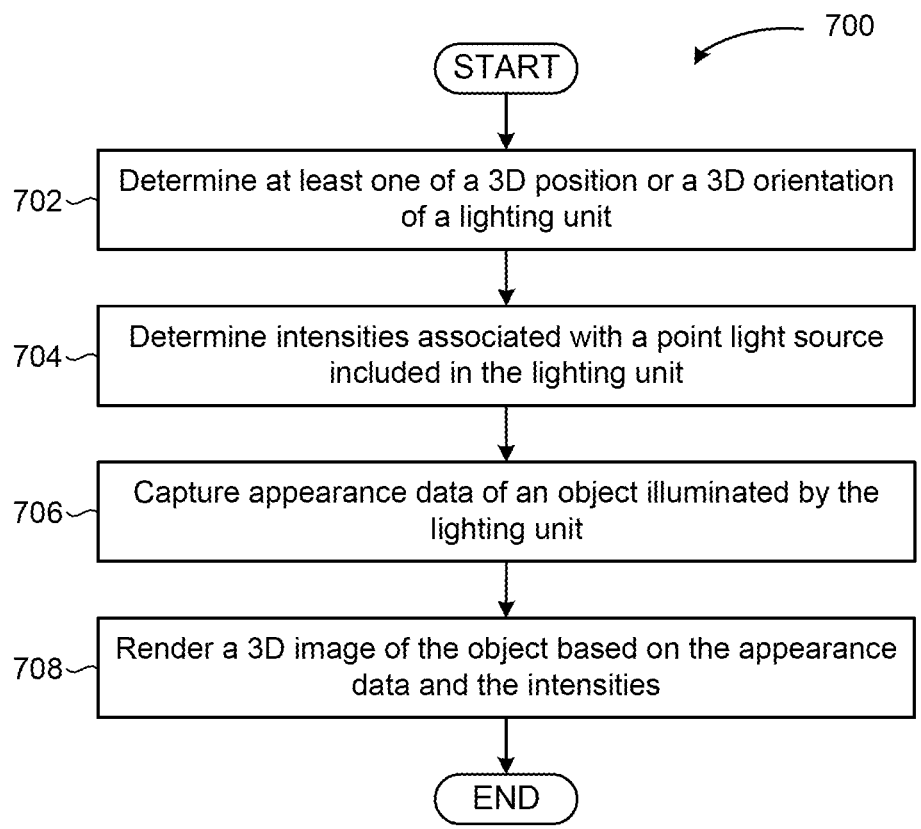
FIG. 7 is a flow diagram of method steps for reconstructing near field lighting, according to various embodiments.

FIG. 7 is a flow diagram of method steps for reconstructing near field lighting, according to various embodiments. Although the method steps are described in conjunction with the systems of FIGS. 1-6, persons of ordinary skill in the art will understand that any system configured to perform the method steps, in any order, is within the scope of the present disclosure.

As shown, a method 700 begins at step 702, where a CPU 102 executing a near field lighting reconstruction module 220 determines at least one of a 3D position or a 3D orientation of a lighting unit based on a plurality of captured images of a mirror sphere. CPU 102 determines the position and orientation of each lighting unit. To locate each lighting unit in 3D space, CPU 102 identifies and annotates the corner vertices of each lighting unit as the corner vertices appear on the multi-view images of the mirror sphere, as captured by the image capture devices. For each identified and annotated corner vertex, CPU 102 projects 3D rays from each image capture device through the identified and annotated corner vertex and reflects the 3D rays off of the mirror sphere. CPU 102 sets the position of the current 3D corner vertex as the position in 3D space that is closest to all reflected rays. CPU 102 repeats this process for all remaining corner vertices for each of the lighting units. In addition, CPU 102 determines the orientation of each lighting unit. Based on the 3D positions of the corner vertices of the lighting unit, CPU 102 determines the plane in 3D space that intersects the corner vertices. Based on this plane, CPU 102 computes a normal vector of the plane. CPU 102 selects the direction of the normal vector that is towards the center of the mirror sphere. In some examples, CPU 102 determines the orientation of each lighting unit by weakly enforcing a regularization constraint that orients the normal vector of the plane of the lighting unit towards the center of the mirror sphere, while accounting for potential inaccuracies in the annotations of the corner vertices.

At step 704, for each point light source in a plurality of point light sources included in the lighting unit, CPU 102 determines an intensity associated with the point light source. In so doing, CPU 102 samples a set of point light sources inside each lighting unit. CPU 102 captures an HDR image of the mirror sphere with an unpolarized image capture device. For each pixel in this HDR image, CPU 102 projects a 3D ray towards the mirror sphere and assigns the observed pixel intensity to the point light source that is nearest to the reflected ray. Each point light source can accumulate the intensity contributions of multiple pixels in the HDR image. During accumulation, CPU 102 adjusts the intensity contribution of each pixel to factor out the attenuation of light along the ray as the light travels from the point light source to the mirror sphere, using the inverse-square-distance law. Via this technique, CPU 102 generates a reconstructed set of near field positional lighting units with more accurate, spatially-varying light source intensities during rendering, relative to a conventional environment map that assumes distant lighting units.

At step 706, CPU 102 captures appearance data of an object, such as human skin or a human head, where the object is illuminated by the lighting unit. CPU 102 captures the appearance based on the intensities determined at steps 702 and 704.

At step 708, CPU 102 renders an image of the object being captured based on the appearance data captured at step 706 and the intensities associated with each point light source determined at steps 702 and 704. As a result, the image of the object being captured is more accurate because the image is based on a more realistic model of near field lighting units relative to conventional techniques. In some examples, CPU 102 performing an inverse rendering operation without manual intervention, such as by imaging a diffuse object, imaging cross-polarized views of the object being captured, and/or the like. With this inverse rendering approach, CPU 102 independently illuminates each lighting unit one-by-one (and/or in combinations) and adjusts the intensities of the point light sources within the lighting unit to best fit the captured images. The method 700 then terminates.

Figure 8:
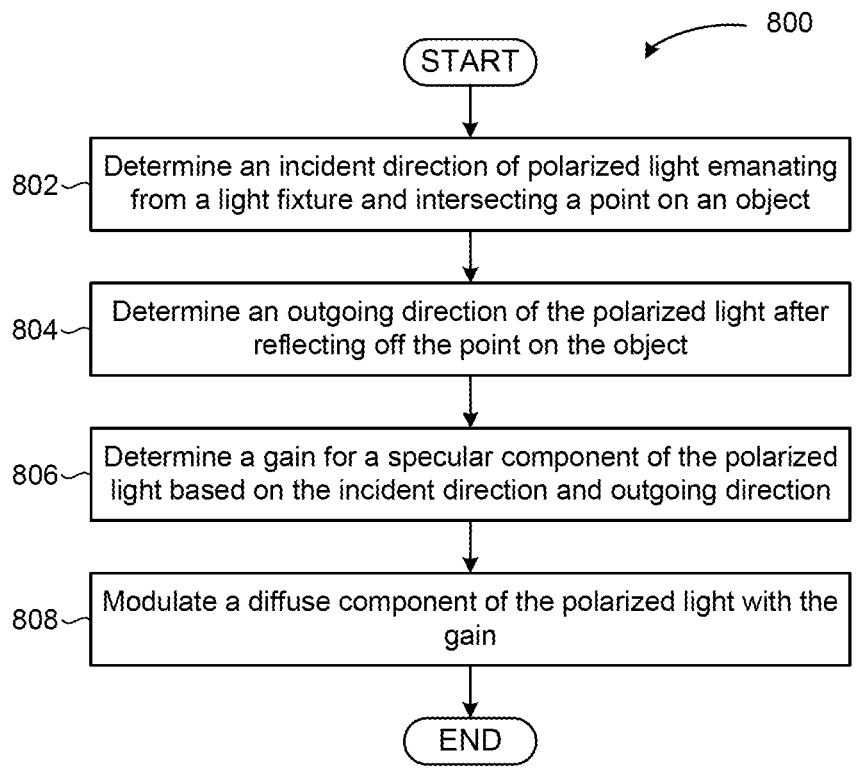
FIG. 8 is a flow diagram of method steps for modeling specular reflection of polarized light, according to various embodiments.

FIG. 8 is a flow diagram of method steps for modeling specular reflection of polarized light, according to various embodiments. Although the method steps are described in conjunction with the systems of FIGS. 1-6, persons of ordinary skill in the art will understand that any system configured to perform the method steps, in any order, is within the scope of the present disclosure.

As shown, a method 800 begins at step 802, where, for a first point on an object being captured, such as human skin or a human head, a CPU 102 executing a polarization modeling module 222 determines an incident direction of polarized light emanating from the lighting unit and intersecting the first point. CPU 102 simulates each of the lighting units as a lighting unit that casts incident light, represented as $s_i$, on a polarization filter, represented by Mueller matrix $M_0$ that is linearly polarized in a horizontal direction. As a result, the emergent light is linearly polarized in a horizontal direction, which is expressed as Stokes vector $s_a = M_0 \times s_i = (1, 1, 0, 0)$. At each point on the object being captured, CPU 102 determines the direction of the incident light from the lighting unit via the polarization filter.

At step 804, the CPU 102 determines an outgoing direction of the polarized light after reflecting off the first point. In addition to determining an incident direction of polarized light emanating from the lighting unit, the CPU 102 further determines the direction of the outgoing emergent light after specular reflection off the surface of the object being captured. Given the direction of the incident light and the direction of the outgoing emergent light, CPU 102 determines Mueller matrix $M_1$ that represents the transformation of the incident light from the polarization filter after specular reflection off the surface of the object being captured.

At step 806, the CPU 102 determines a gain for a specular component of the polarized light based on the incident direction and the outgoing direction. The reflected light determined at step 804 is expressed as Stokes vector $s_b = M_1 \times s_a = (s_0, s_1, s_2, s_3)$. Stokes parameter $s_0$ of Stokes vector $s_b$ is referred to herein as the Fresnel gain for the specular component.

At step 808, CPU 102 modulates a diffuse component of the polarized light with the gain. CPU 102 modulates the diffuse component of the polarized light with 1 minus the Fresnel gain, or $(1-s_0)$. In this manner, CPU 102 models specular reflectance component of polarized light rather than only the diffuse reflectance component of polarized light. The method 800 then terminates.

Figure 9:
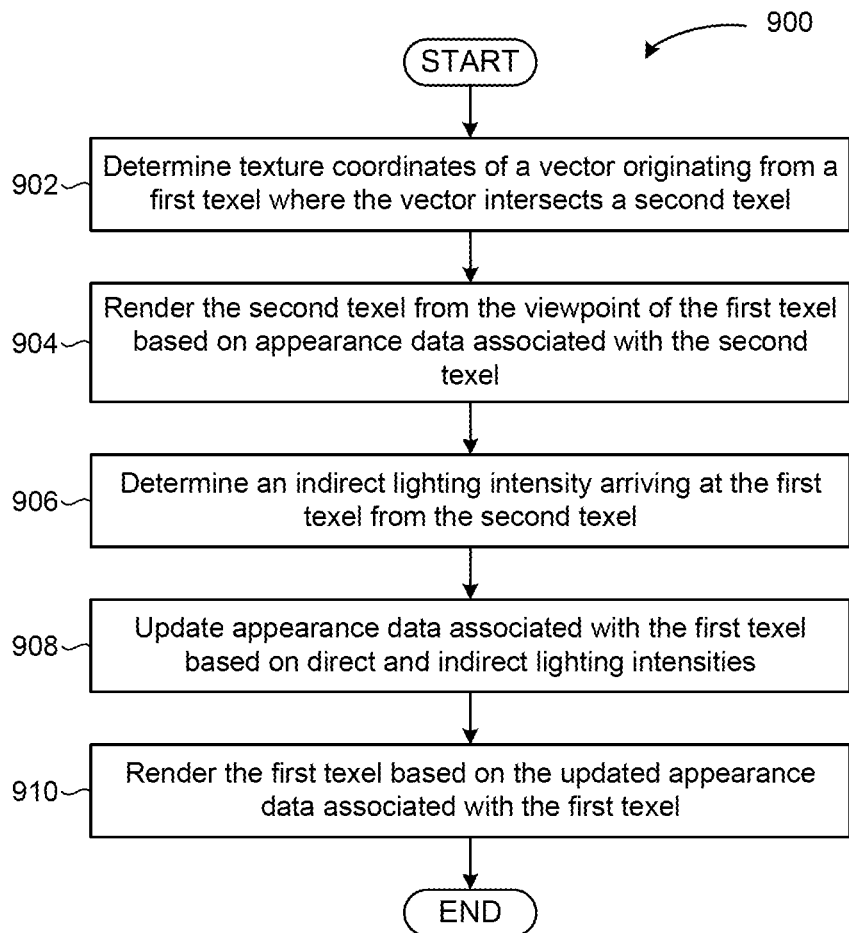
FIG. 9 is a flow diagram of method steps for determining indirect lighting effects during appearance capture, according to various embodiments.

FIG. 9 is a flow diagram of method steps for determining indirect lighting effects during appearance capture, according to various embodiments. Although the method steps are described in conjunction with the systems of FIGS. 1-6, persons of ordinary skill in the art will understand that any system configured to perform the method steps, in any order, is within the scope of the present disclosure.

As shown, a method 900 begins at step 902, where a CPU 102 executing a texture space indirect illumination module 224 determines texture coordinates of a vector originating from a first texel where the vector intersects a second texel. CPU 102 projects 3D rays from the 3D position of texel $\mu_0$ along random directions over the hemisphere of the object being captured that is visible to one or more imaging devices. For each 3D ray, CPU 102 determines if the 3D ray intersects the geometry of the object at one or more neighboring texels $\mu_i$. CPU 102 stores the UV coordinates of these intersections with neighboring texels $\mu_i$.

At step 904, CPU 102 renders the second texel from the viewpoint of the first texel based on appearance data at the second texel. For each intersection stored in at step 902, CPU 102 uses the current appearance parameters at the corresponding neighboring texel $\mu_i$ to render texel $\mu_i$ from the viewpoint of the current texel $\mu_0$.

At step 906, the CPU 102, based on the rendering of the second texel, determines an indirect lighting intensity incident to the first texel from the second texel. CPU 102 uses the result of rendering texel $\mu_i$ at step 904 as the intensity of indirect lighting incident to texel $\mu_i$ to constrain inverse rendering at texel $\mu_0$.

At step 908, the CPU 102 updates appearance data at the first texel based on a direct lighting intensity and the indirect lighting intensity. CPU 102 performs an optimization step to update the appearance parameters at texel $\mu_0$, thereby rendering texel $\mu_0$ with both direct and indirect lighting.

At step 910, CPU 102 renders the first texel based on the updated appearance data at the first texel. By accounting for indirect reflection of light, CPU 102 can generate softer and more realistic rendering of the shadows. As a result, CPU 102 can generate facial appearance maps (such as diffuse and specular albedo maps) that are more complete or with less overshoot, particularly in areas of concavities on the object begin captured. The method 900 then terminates.

In sum, various embodiments are directed to techniques for capturing facial appearance data for the purpose of realistic rendering of human faces. The embodiments include improved lighting models for appearance capture that more accurately represent the lighting, while minimally increasing computational cost. The disclosed techniques can be employed in any combination.

In a first technique, referred to as "near field light reconstruction," a computer system uses multi-view images and triangulation to precisely measure the 3D locations of lighting unit for high-fidelity appearance capture. With this technique, the geometry of each lighting unit is represented as a rectangular 3D surface with known width and height (from manual measurements) and with position and orientation information in 3D space that is determined from multi-view images of a mirror sphere.

In a second technique, referred to as "polarization modeling," a computer system models a specular component in cross-polarized views rather than assuming purely diffuse reflectance for cross-polarized views. In a cross-polarized view, the lighting unit is polarized in one direction and the cameras are fitted with filters that are polarized in a different cross-polarized direction. Although most reflectance in a cross-polarized view is diffuse reflectance, the second technique models the remaining specular reflectance.

In a third technique, referred to as texture space indirect illumination, a computer system models indirect lighting that results from light reflecting off one portion of the face and illuminating a different part of the, such as when light reflects off the inner cheek and partially illuminates the nose. This technique can be readily incorporated into different inverse-rendering pipelines.

At least one technical advantage of the disclosed techniques relative to the prior art is that, with the disclosed near field light reconstruction, lighting is more accurately modeled for multiple near field lighting units. As a result, a field of near positional lights is reconstructed that more faithfully represents the true lights in the scene as compared to a conventional distant environment map. The disclosed polarization modeling more accurately models specular reflectance present in polarized lighting units, thereby improving appearance and reducing rendering error relative to techniques that model only the diffuse reflectance from polarized lighting units. The disclosed texture space indirect illumination more accurately models facial characteristics where light reflects off one portion of a facial model and strikes another portion of the facial model. Another technical advantage relative to the prior art is that the disclosed techniques, whether employed individually or in combination, provide improved accuracy and realism when rendering objects from appearance capture data with only modest increases in computational cost relative to prior techniques. The disclosed techniques account for the impact on inverse rendering quality when departing from idealized conditions, leading to more realistic models that more accurately capture and render facial appearance. These advantages represent one or more technological improvements over prior art approaches.

1. In some embodiments, a computer-implemented method for rendering an object from captured appearance data comprises: determining at least one of a three-dimensional (3D) position or a 3D orientation of a lighting unit based on a plurality of captured images of a mirror sphere; for each point light source in a plurality of point light sources included in the lighting unit, determining an intensity associated with the point light source; capturing appearance data of the object, where the object is illuminated by the lighting unit; and rendering an image of the object based on the appearance data and the intensities associated with each point light source in the plurality of point light sources.

2. The computer-implemented method according to clause 1, further comprising: for a first point on the object: determining an incident direction of polarized light emanating from the lighting unit and intersecting the first point; determining an outgoing direction of the polarized light after reflecting off the first point; determining a gain for a specular component of the polarized light based on the incident direction and the outgoing direction; and modulating a diffuse component of the polarized light with the gain.

3. The computer-implemented method according to clause 1 or clause 2, wherein: the polarized light emanating from the lighting unit is polarized in a first direction, an image capture device configured to capture an image of the object is fitted with a filter that is polarized in a second direction, and the diffuse component of the polarized light is further modulated based on a model of the image capture device.

4. The computer-implemented method according to any of clauses 1-3, wherein determining the 3D position of the lighting unit comprises: for each image capture device included in a plurality of image capture devices: identifying a corner vertex of the lighting unit in an image of the mirror sphere captured by the image capture device; projecting a 3D ray from the image capture device towards the mirror sphere, and reflecting the 3D ray off the mirror sphere to generate a reflected 3D ray; and setting the 3D position of the lighting unit as a 3D position that is closest to the reflected 3D rays from the plurality of image capture devices.

5. The computer-implemented method according to any of clauses 1-4, wherein setting the 3D position of the lighting unit comprises regressing the reflected 3D rays to the 3D position of the lighting unit by applying least squares regression to the reflected 3D rays.

6. The computer-implemented method according to any of clauses 1-5, wherein determining the 3D orientation of the lighting unit comprises: determining 3D positions for a set of corner vertices of the lighting unit; determining a plane in 3D space that intersects the set of corner vertices of the lighting unit; computing a normal vector of the plane; and selecting a direction of the normal vector that is towards a center of the mirror sphere.

7. The computer-implemented method according to any of clauses 1-6, wherein determining the intensity associated with the point light source comprises: projecting a first 3D ray from a first pixel in a first captured image included in the plurality of captured images towards the mirror sphere; reflecting the first 3D ray off the mirror sphere to generate a first reflected 3D ray; determining that the first reflected 3D ray intersects a first point light source in the plurality of point light sources; and setting the intensity associated with the first point light source to an intensity contribution of the first pixel.

8. The computer-implemented method according to any of clauses 1-7, wherein determining the intensity associated with the point light source further comprises adjusting the intensity contribution of the first pixel based on an attenuation of light along the first 3D ray as light from the first 3D ray travels from the first point light source to the mirror sphere.

9. The computer-implemented method according to any of clauses 1-8, wherein the attenuation of the light along the first 3D ray is based on an inverse-square-distance law.

10. The computer-implemented method according to any of clauses 1-9, wherein determining the intensity associated with the point light source further comprises: projecting a second 3D ray from a second pixel in the first captured image towards the mirror sphere; reflecting the second 3D ray off the mirror sphere to generate a second reflected 3D ray; determining that the second reflected 3D ray intersects the first point light source; accumulating the intensity associated with the first point light source with an intensity contribution of the second pixel to generate an accumulated intensity; and setting the intensity associated with the first point light source to the accumulated intensity.

11. The computer-implemented method according to any of clauses 1-10, further comprising performing an inverse rendering operation to adjust the intensity associated with the first point light source to best fit the first captured image.

12. In some embodiments, one or more non-transitory computer-readable media store program instructions that, when executed by one or more processors, cause the one or more processors to perform steps of: determining at least one of a three-dimensional (3D) position or a 3D orientation of a lighting unit based on a plurality of captured images of a mirror sphere; for each point light source in a plurality of point light sources included in the lighting unit, determining an intensity associated with the point light source; capturing appearance data of an object, where the object is illuminated by the lighting unit; and rendering an image of the object based on the appearance data and the intensities associated with each point light source in the plurality of point light sources.

13. The one or more non-transitory computer-readable media according to clause 1, wherein determining the 3D position of the lighting unit comprises: for each image capture device included in a plurality of image capture devices: identifying a corner vertex of the lighting unit in an image of the mirror sphere captured by the image capture device; projecting a 3D ray from the image capture device towards the mirror sphere, and reflecting the 3D ray off the mirror sphere to generate a reflected 3D ray; and setting the 3D position of the lighting unit as a 3D position that is closest to the reflected 3D rays from the plurality of image capture devices.

14. The one or more non-transitory computer-readable media according to clause 12 or clause 13, wherein setting the 3D position of the lighting unit comprises regressing the reflected 3D rays to the 3D position of the lighting unit by applying least squares regression to the reflected 3D rays.

15. The one or more non-transitory computer-readable media according to any of clauses 12-14, wherein determining the 3D orientation of the lighting unit comprises: determining 3D positions for a set of corner vertices of the lighting unit; determining a plane in 3D space that intersects the set of corner vertices of the lighting unit; computing a normal vector of the plane; and selecting a direction of the normal vector that is towards the center of the mirror sphere.

16. The one or more non-transitory computer-readable media according to any of clauses 12-15, wherein determining the intensity associated with the point light source comprises: projecting a first 3D ray from a first pixel in a first captured image included in the plurality of captured images towards the mirror sphere; reflecting the first 3D ray off the mirror sphere to generate a first reflected 3D ray; determining that the first reflected 3D ray intersects a first point light source in the plurality of point light sources; and setting the intensity associated with the first point light source to an intensity contribution of the first pixel.

17. The one or more non-transitory computer-readable media according to any of clauses 12-16, wherein determining the intensity associated with the point light source further comprises adjusting the intensity contribution of the first pixel based on an attenuation of light along the first 3D ray as light from the first 3D ray travels from the first point light source to the mirror sphere.

18. The one or more non-transitory computer-readable media according to any of clauses 12-17, wherein the attenuation of the light along the first 3D ray is based on an inverse-square-distance law.

19. The one or more non-transitory computer-readable media according to any of clauses 12-18, wherein determining the intensity associated with the point light source further comprises: projecting a second 3D ray from a second pixel in the first captured image towards the mirror sphere; reflecting the second 3D ray off the mirror sphere to generate a second reflected 3D ray; determining that the second reflected 3D ray intersects the first point light source; accumulating the intensity associated with the first point light source with an intensity contribution of the second pixel to generate an accumulated intensity; and setting the intensity associated with the first point light source to the accumulated intensity.

20. In some embodiments, a system comprises: one or more memories storing instructions; and one or more processors coupled to the one or more memories and, when executing the instructions: determine at least one of a three-dimensional (3D) position or a 3D orientation of a lighting unit based on a plurality of captured images of a mirror sphere; for each point light source in a plurality of point light sources included in the lighting unit, determine an intensity associated with the point light source; capture appearance data of an object, where the object is illuminated by the lighting unit; and render an image of the object based on the appearance data and the intensities associated with each point light source in the plurality of point light sources.

21. In some embodiments, a computer-implemented method for rendering an object from captured appearance data comprising a plurality of texels comprises: determining texture coordinates of a first vector originating from a first texel where the first vector intersects a second texel; rendering the second texel from a viewpoint of the first texel based on appearance data at the second texel; based on the rendering of the second texel, determining an indirect lighting intensity incident to the first texel from the second texel; updating appearance data at the first texel based on a direct lighting intensity and the indirect lighting intensity incident to the first texel from the second texel; and rendering the first texel based on the updated appearance data at the first texel.

22. The computer-implemented method according to clause 21, further comprising: for a first point on the object: determining an incident direction of polarized light emanating from a lighting unit and intersecting the first point; determining an outgoing direction of the polarized light after reflecting off the first point; determining a gain for a specular component of the polarized light based on the incident direction and the outgoing direction; and modulating a diffuse component of the polarized light with the gain.

23. The computer-implemented method according to clause 21 or clause 22, wherein: the polarized light emanating from the lighting unit is polarized in a first direction, an image capture device configured to capture an image of the object is fitted with a filter that is polarized in a second direction, and the diffuse component of the polarized light is further modulated based on a model of the image capture device.

24. The computer-implemented method according to any of clauses 21-23, wherein determining texture coordinates of the first vector originating from the first texel where the first vector intersects the second texel comprises: projecting a plurality of 3D rays from a 3D position of the first texel; determining intersection coordinates where a first 3D ray included in the plurality of 3D rays intersects the second texel; and setting the intersection coordinates as the texture coordinates of the first vector.

25. The computer-implemented method according to any of clauses 21-24, wherein the plurality of 3D rays is projected along random directions over a hemisphere of the object that is visible to one or more imaging devices.

26. The computer-implemented method according to any of clauses 21-25, further comprising: determining texture coordinates of a second vector originating from the first texel where the second vector intersects a third texel; rendering the third texel from a viewpoint of the first texel based on appearance data at the third texel; based on the rendering of the third texel, determining an indirect lighting intensity incident to the first texel from the third texel; and updating appearance data at the first texel further based on the indirect lighting intensity incident to the first texel from the third texel.

27. The computer-implemented method according to any of clauses 21-26, wherein the texture coordinates comprise coordinates in UV space.

28. The computer-implemented method according to any of clauses 21-27, further comprising, prior to determining texture coordinates of the first vector originating from the first texel where the first vector intersects the second texel, determining that the first texel resides in an area of concavity on the object.

29. In some embodiments, one or more non-transitory computer-readable media store program instructions that, when executed by one or more processors, cause the one or more processors to perform steps of: determining texture coordinates of a first vector originating from a first texel where the first vector intersects a second texel; rendering the second texel from a viewpoint of the first texel based on appearance data at the second texel; based on the rendering of the second texel, determining an indirect lighting intensity incident to the first texel from the second texel; updating appearance data at the first texel based on a direct lighting intensity and the indirect lighting intensity; and rendering the first texel based on the updated appearance data at the first texel.

30. The one or more non-transitory computer-readable media according to clause 29, wherein the steps further comprise: for a first point on an object that includes the first texel: determining an incident direction of polarized light emanating from a lighting unit and intersecting the first point; determining an outgoing direction of the polarized light after reflecting off the first point; determining a gain for a specular component of the polarized light based on the incident direction and the outgoing direction; and modulating a diffuse component of the polarized light with the gain.

31. The one or more non-transitory computer-readable media according to clause 29 or clause 30, wherein: the polarized light emanating from the lighting unit is polarized in a first direction, an image capture device configured to capture an image of the object is fitted with a filter that is polarized in a second direction, and the diffuse component of the polarized light is further modulated based on a model of the image capture device.

32. The one or more non-transitory computer-readable media according to any of clauses 29-31, wherein determining texture coordinates of the first vector originating from the first texel where the first vector intersects the second texel comprises: projecting a plurality of 3D rays from a 3D position of the first texel; determining intersection coordinates where a first 3D ray included in the plurality of 3D rays intersects the second texel; and setting the intersection coordinates as the texture coordinates of the first vector.

33. The one or more non-transitory computer-readable media according to any of clauses 29-32, wherein the plurality of 3D rays is projected along random directions over a hemisphere of the object that is visible to one or more imaging devices.

34. The one or more non-transitory computer-readable media according to any of clauses 29-33, wherein the steps further comprise: determining texture coordinates of a second vector originating from the first texel where the second vector intersects a third texel; rendering the third texel from a viewpoint of the first texel based on appearance data at the third texel; based on the rendering of the third texel, determining an indirect lighting intensity incident to the first texel from the third texel; and updating appearance data at the first texel further based on the indirect lighting intensity incident to the first texel from the third texel.

35. The one or more non-transitory computer-readable media according to any of clauses 29-34, wherein the texture coordinates comprise coordinates in UV space.

36. The one or more non-transitory computer-readable media according to any of clauses 29-35, wherein the steps further comprise, prior to determining texture coordinates of the first vector originating from the first texel where the first vector intersects the second texel, determining that the first texel resides in an area of concavity on the object.

37. In some embodiments, a system, comprises: one or more memories storing instructions; and one or more processors coupled to the one or more memories and, when executing the instructions: determine texture coordinates of a first vector originating from a first texel where the first vector intersects a second texel; render the second texel from a viewpoint of the first texel based on appearance data at the second texel; based on the rendering of the second texel, determine an indirect lighting intensity incident to the first texel from the second texel; update appearance data at the first texel based on a direct lighting intensity and the indirect lighting intensity; and render the first texel based on the updated appearance data at the first texel.

38. The system according to clause 37, wherein, to determine texture coordinates of the first vector originating from the first texel where the first vector intersects the second texel, the one or more processors further: project a plurality of 3D rays from a 3D position of the first texel; determine intersection coordinates where a first 3D ray included in the plurality of 3D rays intersects the second texel; and set the intersection coordinates as the texture coordinates of the first vector.

39. The system according to clause 37 or clause 38, wherein the plurality of 3D rays is projected along random directions over a hemisphere of the object that is visible to one or more imaging devices.

40. The system according to any of clauses 37-39, wherein the one or more processors further: determine texture coordinates of a second vector originating from the first texel where the second vector intersects a third texel; render the third texel from a viewpoint of the first texel based on appearance data at the third texel; based on the rendering of the third texel, determine an indirect lighting intensity incident to the first texel from the third texel; and update appearance data at the first texel further based on the indirect lighting intensity incident to the first texel from the third texel.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for rendering an object from captured appearance data, the method comprising:
    determining at least one of a three-dimensional (3D) position or a 3D orientation of a lighting unit based on a plurality of captured images of a mirror sphere;
    for each point light source in a plurality of point light sources included in the lighting unit, determining an intensity associated with the point light source;
    capturing appearance data of the object, where the object is illuminated by the lighting unit; and
    rendering an image of the object based on the appearance data and the intensities associated with each point light source in the plurality of point light sources.

2. The computer-implemented method of claim 1, further comprising: for a first point on the object:
    determining an incident direction of polarized light emanating from the lighting unit and intersecting the first point;
    determining an outgoing direction of the polarized light after reflecting off the first point;
    determining a gain for a specular component of the polarized light based on the incident direction and the outgoing direction; and
    modulating a diffuse component of the polarized light with the gain.

3. The computer-implemented method of claim 2, wherein:
    the polarized light emanating from the lighting unit is polarized in a first direction,
    an image capture device configured to capture an image of the object is fitted with a filter that is polarized in a second direction, and
    the diffuse component of the polarized light is further modulated based on a model of the image capture device.

4. The computer-implemented method of claim 1, wherein determining the 3D position of the lighting unit comprises:
    for each image capture device included in a plurality of image capture devices:
        identifying a corner vertex of the lighting unit in an image of the mirror sphere captured by the image capture device;
        projecting a 3D ray from the image capture device towards the mirror sphere, and
        reflecting the 3D ray off the mirror sphere to generate a reflected 3D ray; and
    setting the 3D position of the lighting unit as a 3D position that is closest to the reflected 3D rays from the plurality of image capture devices.

5. The computer-implemented method of claim 4, wherein setting the 3D position of the lighting unit comprises regressing the reflected 3D rays to the 3D position of the lighting unit by applying least squares regression to the reflected 3D rays.

6. The computer-implemented method of claim 1, wherein determining the 3D orientation of the lighting unit comprises:
    determining 3D positions for a set of corner vertices of the lighting unit;
    determining a plane in 3D space that intersects the set of corner vertices of the lighting unit;
    computing a normal vector of the plane; and
    selecting a direction of the normal vector that is towards a center of the mirror sphere.

7. The computer-implemented method of claim 1, wherein determining the intensity associated with the point light source comprises:
projecting a first 3D ray from a first pixel in a first captured image included in the plurality of captured images towards the mirror sphere;
reflecting the first 3D ray off the mirror sphere to generate a first reflected 3D ray;
determining that the first reflected 3D ray intersects the point light source; and
setting the intensity associated with the point light source to an intensity contribution of the first pixel.

8. The computer-implemented method of claim 7, wherein determining the intensity associated with the point light source further comprises adjusting the intensity contribution of the first pixel based on an attenuation of light along the first 3D ray as light from the first 3D ray travels from the point light source to the mirror sphere.

9. The computer-implemented method of claim 8, wherein the attenuation of the light along the first 3D ray is based on an inverse-square-distance law.

10. The computer-implemented method of claim 7, wherein determining the intensity associated with the point light source further comprises:
projecting a second 3D ray from a second pixel in the first captured image towards the mirror sphere;
reflecting the second 3D ray off the mirror sphere to generate a second reflected 3D ray;
determining that the second reflected 3D ray intersects the point light source;
accumulating the intensity associated with the point light source with an intensity contribution of the second pixel to generate an accumulated intensity; and
setting the intensity associated with the point light source to the accumulated intensity.

11. The computer-implemented method of claim 7, further comprising performing an inverse rendering operation to adjust the intensity associated with the point light source to best fit the first captured image.

12. One or more non-transitory computer-readable media storing program instructions that, when executed by one or more processors, cause the one or more processors to perform steps of:
determining at least one of a three-dimensional (3D) position or a 3D orientation of a lighting unit based on a plurality of captured images of a mirror sphere;
for each point light source in a plurality of point light sources included in the lighting unit, determining an intensity associated with the point light source;
capturing appearance data of an object, where the object is illuminated by the lighting unit; and
rendering an image of the object based on the appearance data and the intensities associated with each point light source in the plurality of point light sources.

13. The one or more non-transitory computer-readable media of claim 12, wherein determining the 3D position of the lighting unit comprises:
for each image capture device included in a plurality of image capture devices:
identifying a corner vertex of the lighting unit in an image of the mirror sphere captured by the image capture device;
projecting a 3D ray from the image capture device towards the mirror sphere, and
reflecting the 3D ray off the mirror sphere to generate a reflected 3D ray; and
setting the 3D position of the lighting unit as a 3D position that is closest to the reflected 3D rays from the plurality of image capture devices.

14. The one or more non-transitory computer-readable media of claim 13, wherein setting the 3D position of the lighting unit comprises regressing the reflected 3D rays to the 3D position of the lighting unit by applying least squares regression to the reflected 3D rays.

15. The one or more non-transitory computer-readable media of claim 12, wherein determining the 3D orientation of the lighting unit comprises:
determining 3D positions for a set of corner vertices of the lighting unit;
determining a plane in 3D space that intersects the set of corner vertices of the lighting unit;
computing a normal vector of the plane; and
selecting a direction of the normal vector that is towards the center of the mirror sphere.

16. The one or more non-transitory computer-readable media of claim 12, wherein determining the intensity associated with the point light source comprises:
projecting a first 3D ray from a first pixel in a first captured image included in the plurality of captured images towards the mirror sphere;
reflecting the first 3D ray off the mirror sphere to generate a first reflected 3D ray;
determining that the first reflected 3D ray intersects the point light source; and
setting the intensity associated with the point light source to an intensity contribution of the first pixel.

17. The one or more non-transitory computer-readable media of claim 16, wherein determining the intensity associated with the point light source further comprises adjusting the intensity contribution of the first pixel based on an attenuation of light along the first 3D ray as light from the first 3D ray travels from the point light source to the mirror sphere.

18. The one or more non-transitory computer-readable media of claim 17, wherein the attenuation of the light along the first 3D ray is based on an inverse-square-distance law.

19. The one or more non-transitory computer-readable media of claim 16, wherein determining the intensity associated with the point light source further comprises:
projecting a second 3D ray from a second pixel in the first captured image towards the mirror sphere;
reflecting the second 3D ray off the mirror sphere to generate a second reflected 3D ray;
determining that the second reflected 3D ray intersects the point light source;
accumulating the intensity associated with the point light source with an intensity contribution of the second pixel to generate an accumulated intensity; and
setting the intensity associated with the point light source to the accumulated intensity.

20. A system, comprising:
one or more memories storing instructions; and
one or more processors coupled to the one or more memories and, when executing the instructions:
determine at least one of a three-dimensional (3D) position or a 3D orientation of a lighting unit based on a plurality of captured images of a mirror sphere;
for each point light source in a plurality of point light sources included in the lighting unit, determine an intensity associated with the point light source;
capture appearance data of an object, where the object is illuminated by the lighting unit; and render an image of the object based on the appearance data and the intensities associated with each point light source in the plurality of point light sources.

* * * * *